(12) United States Patent
Jun et al.

(10) Patent No.: US 11,019,337 B2
(45) Date of Patent: May 25, 2021

(54) VIDEO ENCODING APPARATUS

(71) Applicant: Samsung Electronics Co., Ltd., Suwon-si (KR)

(72) Inventors: Sung Ho Jun, Hwaseong-si (KR); Jung Yeop Yang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 32 days.

(21) Appl. No.: 15/903,278

(22) Filed: Feb. 23, 2018

(65) Prior Publication Data

US 2019/0068968 A1    Feb. 28, 2019

(30) Foreign Application Priority Data

Aug. 29, 2017    (KR) .......................... 10-2017-0109462

(51) Int. Cl.
| | |
|---|---|
| *H04N 19/124* | (2014.01) |
| *H04N 19/61* | (2014.01) |
| *H04N 19/176* | (2014.01) |
| *H04N 19/115* | (2014.01) |
| *H04N 19/167* | (2014.01) |
| *H04N 19/174* | (2014.01) |
| *H04N 19/152* | (2014.01) |
| *H04N 19/12* | (2014.01) |
| *H04N 19/184* | (2014.01) |
| *H04N 19/63* | (2014.01) |

(52) U.S. Cl.
CPC ......... *H04N 19/124* (2014.11); *H04N 19/115* (2014.11); *H04N 19/12* (2014.11); *H04N 19/152* (2014.11); *H04N 19/167* (2014.11); *H04N 19/174* (2014.11); *H04N 19/176* (2014.11); *H04N 19/184* (2014.11); *H04N 19/61* (2014.11); *H04N 19/63* (2014.11)

(58) Field of Classification Search
CPC .... H04N 19/61; H04N 19/176; H04N 19/115; H04N 19/12; H04N 19/124; H04N 19/63; H04N 19/184
See application file for complete search history.

(56) References Cited

U.S. PATENT DOCUMENTS

| | | | |
|---|---|---|---|
| 5,231,484 A | 7/1993 | Gonzales et al. | |
| 5,852,669 A | 12/1998 | Eleftheriadis et al. | |
| 6,111,991 A | 8/2000 | Ribas-Corbera et al. | |
| 6,151,362 A * | 11/2000 | Wang ................... | H04N 19/159 375/240.12 |

(Continued)

FOREIGN PATENT DOCUMENTS

KR    10-2013-0135659    12/2013

*Primary Examiner* — Shawn S An
(74) *Attorney, Agent, or Firm* — Harness, Dickey & Pierce, P.L.C.

(57) ABSTRACT

A video encoding apparatus may include a partitioning unit which divides a frame included in input video into a plurality of blocks and a rate control module which adjusts a first quantization parameter value of a block corresponding to a region of interest among the plurality of blocks based on a first CBF (current buffer fullness) value of the region of interest, and adjusts a second quantization parameter value of a block corresponding to a non-region of interest among the plurality of blocks based on a second CBF value of the non-region of interest.

20 Claims, 11 Drawing Sheets

(56) References Cited

U.S. PATENT DOCUMENTS

| | | | | |
|---|---|---|---|---|
| 6,493,388 | B1* | 12/2002 | Wang | H04N 21/2365 |
| | | | | 375/240.12 |
| 7,194,031 | B2* | 3/2007 | Chang | H04N 19/176 |
| | | | | 375/240.03 |
| 7,330,509 | B2 | 2/2008 | Lu et al. | |
| 8,611,426 | B2 | 12/2013 | Kawahara | |
| 9,420,279 | B2 | 8/2016 | Jang et al. | |
| 2001/0001016 | A1* | 5/2001 | Tan | H04N 21/23614 |
| | | | | 382/233 |
| 2002/0090140 | A1* | 7/2002 | Thirsk | G06T 9/00 |
| | | | | 382/239 |
| 2005/0140781 | A1 | 6/2005 | Chi et al. | |
| 2006/0062478 | A1 | 3/2006 | Cetin et al. | |
| 2006/0146928 | A1* | 7/2006 | Wang | H04N 19/176 |
| | | | | 375/240.03 |
| 2007/0104272 | A1* | 5/2007 | He | H04N 19/134 |
| | | | | 375/240.12 |
| 2010/0246662 | A1* | 9/2010 | Koto | H04N 21/8547 |
| | | | | 375/240.1 |
| 2012/0249746 | A1* | 10/2012 | Cornog | H04N 13/128 |
| | | | | 348/47 |
| 2013/0243100 | A1* | 9/2013 | Liu | H04N 19/428 |
| | | | | 375/240.25 |
| 2013/0251031 | A1 | 9/2013 | Yitschak et al. | |
| 2014/0160139 | A1* | 6/2014 | MacInnis | H04N 19/46 |
| | | | | 345/545 |
| 2016/0337647 | A1 | 11/2016 | Cheok et al. | |

* cited by examiner

Number of Target bits < Number of Coded bits

Number of Target bits > Number of Coded bits

Number of Target bits > Number of Coded bits

Number of Target bits < Number of Coded bits

Number of Target bits < Number of Coded bits

Number of Target bits < Number of Coded bits

Number of Target bits < Number of Coded bits

Number of Target bits < Number of Coded bits

VIDEO ENCODING APPARATUS

This application claims priority from Korean Patent Application No. 10-2017-0109462 filed on Aug. 29, 2017 in the Korean Intellectual Property Office, the disclosure of which is incorporated herein by reference in its entirety.

BACKGROUND

1. Technical Field

Example embodiments relate to a video encoding apparatus.

2. Description of the Related Art

Demand for high resolution and high quality videos such as HD (High Definition) video and UHD (Ultra High Definition) video is increasing, and in order to process high resolution and high quality video, a high performance video compression technique may be utilized.

Recently, mobile devices such as a mobile phone and a smart phone have been widely used, and in the mobile devices having a small size and a limited environment such as a use of a battery, research on various methods capable of efficiently compressing high resolution and high quality videos have been performed.

Recently, in order to execute encoding of the input video, in the video encoding system, a technique of classifying frames in the video into blocks corresponding to a region of interest and blocks corresponding to a non-region of interest, and assigning different numbers of bits has been widely used.

In particular, when determining quantization parameter values of a first block corresponding to the region of interest and a second block corresponding to the non-region of interest, offset values are added to or subtracted from base quantization parameter values allocated to the plurality of blocks, and the quantization parameter values of the first block and the second block are adjusted using a value of current buffer fullness (CBF). However, since the quantization parameter values of the first block and the second block are adjusted using a same CBF value, the video quality of the first block corresponding to the region of interest may be degraded.

SUMMARY

Example embodiments may reduce degradation of the video quality of the block corresponding to the region of interest by adjusting the quantization parameter values using the different CBF values, when adjusting the quantization parameter values of the block corresponding to the region of interest and the quantization parameter values of the block corresponding to the non-region of interest.

Further, some example embodiments may enhance an accuracy of rate control, by adjusting the quantization parameter values of the blocks corresponding to each region, based on the CBF values stored in each of the multiple virtual buffers.

Example embodiments are not limited to those mentioned above and modifications which have not been mentioned can be clearly understood by those skilled in the art from the description below.

According to an example embodiment, a video encoding apparatus may include a memory and a processor, the memory containing computer readable code executable by the processor to, divide a frame included in input video into a plurality of blocks, adjust a first quantization parameter value of a block corresponding to a region of interest (ROI) among the plurality of blocks based on a first current buffer fullness (CBF) value of the ROI, and adjust a second quantization parameter value of a block corresponding to a non-region of interest (non-ROI) among the plurality of blocks based on a second CBF value of the non-ROI.

According to an example embodiment, a video encoding apparatus may include a memory and a processor, the memory containing computer readable code executable by the processor to, divide a frame included in an input video into a plurality of blocks, the plurality of blocks including a first block and a second block, the second block being adjacent to the first block, determine quantization parameter values associated with each of the plurality of blocks, the quantization parameter values including a first quantization parameter value associated with the first block and a second quantization parameter value associated with the second block, adjust the first quantization parameter value of the first block based on a first current buffer fullness (CBF) value, and adjust the second quantization parameter value of the second block based on a second CBF value, the second CBF value being different from the first CBF value.

According to an example embodiment, a video encoding apparatus may include a memory and a processor, the memory containing computer readable code executable by the processor to, divide a frame included in an input video into a plurality of blocks, the plurality of blocks each corresponding to one of a region of interest (ROI) and a non-region of interest (non-ROI), determine quantization parameter values of each of the plurality of blocks, update, after encoding a first block of the plurality of blocks, a first current buffer fullness (CBF) value of the ROI based on a number of bits generated by the first block and a number of target bits of the first block, when the encoded first block is a block corresponding to the ROI, and update, after encoding the first block, a second CBF value of the non-ROI based on the number of bits generated by the first block and the number of target bits of the first block, when the encoded first block is a block corresponding to the non-ROI.

However, example embodiments of the inventive concepts are not restricted to the one set forth herein. The above and other aspects of the example embodiments of the inventive concepts will become more apparent to one of ordinary skill in the art to which the example embodiments of the inventive concepts pertain by referencing the detailed description of some of the example embodiments of the inventive concepts given below.

BRIEF DESCRIPTION OF THE DRAWINGS

The above and other aspects and features of example embodiments will become more apparent by describing in detail some example embodiments thereof with reference to the attached drawings, in which.

DETAILED DESCRIPTION

Figure 1:
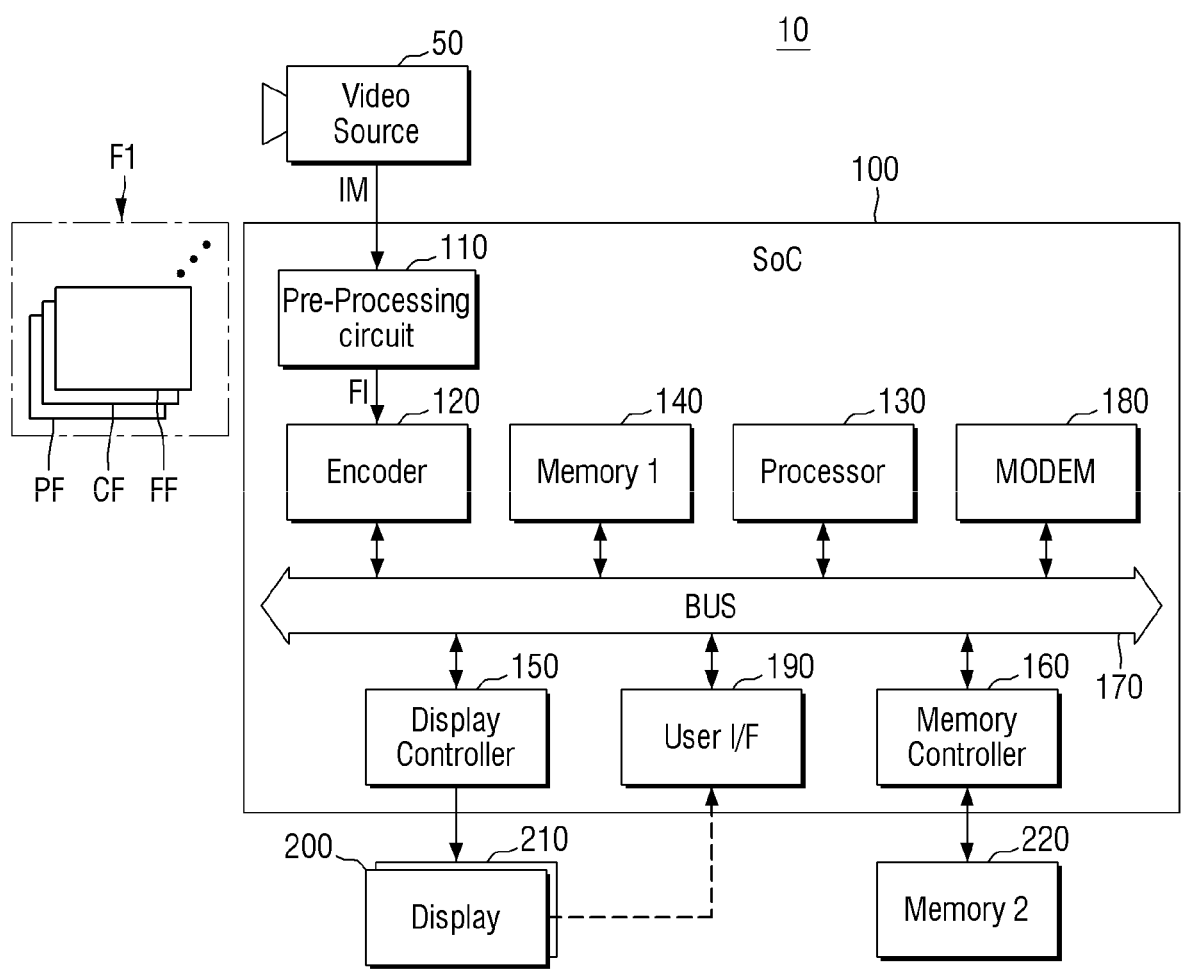
FIG. 1 is a block diagram illustrating a video encoding system according to some example embodiments.

FIG. 1 is a block diagram illustrating a video encoding system according to some example embodiments.

Referring to FIG. 1, a video encoding system 10 may refer to various devices capable of processing 2D or 3D graphics data and displaying processed data.

For example, the video encoding system 10 may be provided as one of a TV, a Digital TV (DTV), an internet protocol TV (IPTV), a personal computer (PC), a desktop computer, a laptop computer, a computer workstation, a tablet PC, a video game platform (or a video game console), a server, and a mobile computing device. Here, the mobile computing device may be provided as a mobile phone, a smart phone, an enterprise digital assistant (EDA), a digital still camera, a digital video camera, a portable multimedia player (PMP), a personal navigation device or a portable navigation device (PND), a mobile internet device (MID), a wearable computer, an internet of Things (IOT) device, an Internet of Everything (IOE) device or an e-book.

The video encoding system 10 may include a video source 50, a video encoding apparatus 100, a display 200, an input device 210 and a second memory 220. Here, the video encoding apparatus 100 may be made up of a system on chip (SoC). Example embodiments are not limited to the constituent elements illustrated in FIG. 1, and, thus, constituent elements more or fewer than those listed above may be included.

The video source 50 may be provided, for example, as a camera equipped with a CCD or a CMOS video sensor. The video source 50 may capture a subject, generate the first data IM of the subject, and provide the generated first data IM to the video encoding apparatus 100. The first data IM may be still video data or moving video data. In some embodiments, the video source 50 may be included in the host. In this case, the first data IM may be video data provided from the host. However, example embodiments are not limited thereto The video encoding apparatus 100 may generally control the operation of the video encoding system 10. For example, the video encoding apparatus 100 may include an integrated circuit (IC), a motherboard, an application processor (AP) or a mobile AP capable of performing operations according to some example embodiments. The video encoding apparatus 100 processes the first data IM that is output from the video source 50, displays the processed data via the display 200, or displays the processed data in the second memory 220 or may transfer the processed data to another data processing system.

A video encoding apparatus 100 may include a preprocessing circuit 110, a video encoding apparatus 120 (an encoder), a processor 130, a first memory 140, a display controller 150, a memory controller 160, a bus 170, a modem 180, and a user interface 190. However, the above-described constituent elements are not indispensable for providing the video encoding apparatus 100, and may have more or fewer constituent elements than those listed above.

The encoder 120, the processor 130, the first memory 140, the display controller 150, the memory controller 160, the modem 180 and the user interface 190 may send and receive data through the bus 170. As an example, the bus 170 may be provided, but is not limited to, as at least one selected from a peripheral component interconnect (PCI) bus, a PCI express (PCIe), an advanced microcontroller bus architecture (AMBA), an advanced high performance bus (AHB), an advanced peripheral bus (APB), an advanced extensible interface (AXI) bus, and combinations thereof.

The pre-processing circuit 110 may receive the first data IM that is output from the video source 50. The pre-processing circuit 110 may process the received first data IM and provide the second data FI generated in accordance with the processing result to the encoder 120. Under an environment in which the video encoding apparatus 100 is driven, the first data IM and the second data FI may be provided, for example, in units of frames (or pictures). For example, the second data FI may be a data set including data of a past frame (PF), data of a current frame (CF), and data of a future frame (FF), based on a specific time point. Hereinafter, for the sake of convenience of explanation, the description will be given only to the case of encoding the current frame CF included in the second data FI.

The pre-processing circuit 110 may include, for example, an image signal processor (ISP). For example, the ISP may convert the first data IM having the first data format into the second data FI.

For example, the first data IM may be data having a Bayer pattern and the second data FI may be YUV data, but example embodiments are not limited thereto.

Although the pre-processing circuit 110 is illustrated in FIG. 1 as being provided inside the video encoding apparatus 100, example embodiments are not limited thereto, and the pre-processing circuit 110 may be provided outside the video encoding apparatus 100.

The encoder 120 may perform the encoding operation on each of the plurality of blocks of the current frame CF included in the second data FI.

The above encoding operation may use, but is not limited to, a video data encoding technique such as JPEG (Joint Picture Expert Group), MPEG (Motion Picture Expert Groups), MPEG-2, MPEG-4, VC-1, H.264, H.265, or HEVC (High Efficiency Video Coding).

The encoder 120 may be provided as a hardware codec or a software codec. The software codec apparatus may be executed by the processor 130.

The processor 130 may control the operation of the video encoding apparatus 100.

While as discussed below, in some example embodiments. the each of the elements of the video encoding apparatus 100 may be discrete hardware circuits, in other example embodiments, the processor 130 may be configured, through a layout design or execution of computer readable instructions stored in the memory, as a special purpose computer to perform the functions of one or more of the pre-processing circuit 110, the encoder 120, the display controller 150, the memory controller 160, and the modem 180.

For example, the processor 130 may be configured to divide a frame included in input video into a plurality of blocks, adjust a first quantization parameter value of a block corresponding to a region of interest (ROI) among the plurality of blocks based on a first current buffer fullness (CBF) value associated with the ROI, and adjust a second quantization parameter value of a block corresponding to a non-region of interest (non-ROI) among the plurality of blocks based on a second CBF value associated with the non-ROI.

In view of the above, the special purpose processor 130 may improve the functioning of the video encoding system 10 itself by reducing degradation of the video quality of the block corresponding to the ROI by adjusting the quantization parameter values of the block associated with the ROI and the block associated with non-ROI using the different CBF values.

The processor 130 may include any processing circuitry. The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processor 130 may receive the provision of user input so that one or more applications (e.g., software applications) can be executed.

A part of the applications executed by the processor 130 may be a video call application. Also, the applications executed by the processor 130 may include, but is not limited to, an operating system (OS) word processor application, a media player application, a video game application, and/or a graphical user interface (GUI) application.

The first memory 140 may store interest region information used at the time of video encoding. Information on the region of interest may be information indicating which blocks are the blocks corresponding to the region of interest (ROI) and the blocks corresponding to the non-region of interest (non-ROI) within the current frame CF of the input video.

The first memory 140 may transmit information on the region of interest corresponding to the current frame CF of the input video to the encoder 120, under the control of the memory controller 160.

The memory controller 160 may write the data encoded by the encoder 120 or the data output from the processor 130 on the second memory 220, under the control of the encoder 120 or the processor 130.

The first memory 140 may be provided as a volatile memory such as SRAM (Static Random Access Memory). The volatile memory may be provided as a RAM (random access memory), a SRAM (static RAM), a DRAM (dynamic RAM), a SDRAM (synchronous DRAM), a T-RAM (thyristor RAM), a Z-RAM (zero capacitor RAM) or TTRAM (Twin Transistor RAM). However, example embodiments are not limited thereto, and the first memory 140 may be provided as a non-volatile memory.

The second memory 220 may be provided as a non-volatile memory. The non-volatile memory may be an EEPROM (electrically erasable programmable read-only memory), a flash memory, an MRAM (magnetic RAM), a spin-transfer torque (MRAM), a FeRAM (ferroelectric RAM), a PRAM (phase change RAM), or RRAM (resistive RAM). Further, the non-volatile memory may be provided as an MMC (multimedia card), an eMMC (embedded MMC), a UFS (universal flash storage), a solid-state drive or solid-state disk (SSD), a USB flash drive or a hard disk drive (HDD). However, example embodiments are not limited thereto, and the second memory 220 may be provided as a volatile memory.

Although the second memory 220 is illustrated outside the video encoding apparatus 100 in FIG. 1, the second memory 220 may be provided inside the video encoding apparatus 100, without being limited thereto.

The display controller 150 may transmit the data, which is output from the encoder 120 or the processor 130, to the display 200. The display 200 may be provided as a monitor, a TV monitor, a projection device, a thin film transistor liquid crystal display (TFT-LCD), a light-emitting diode (LED) display, an organic LED (OLED) display, an active-matrix (OLED) display, or a flexible display.

For example, the display controller 150 may transmit data to the display 200 through a Mobile Industry Processor Interface (MIPI) display serial interface (DSI).

The input device 210 may receive a user's input that is input from the user, and may send an input signal to the user interface 190 in response to the user's input.

The input device 210 may be provided as a touch panel, a touch screen, a voice recognizer, a touch pen, a keyboard, a mouse, a track point, etc., but is not limited thereto. For example, when the input device 210 is a touch screen, the input device 210 may include a touch panel and a touch panel controller. The input device 210 may be connected to the display 200, and may be provided separately from the display 200.

The input device 210 may send an input signal to the user interface 190.

The user interface 190 may receive an input signal from the input device 210, and may send data generated by the input signal to the processor 130.

Figure 2:
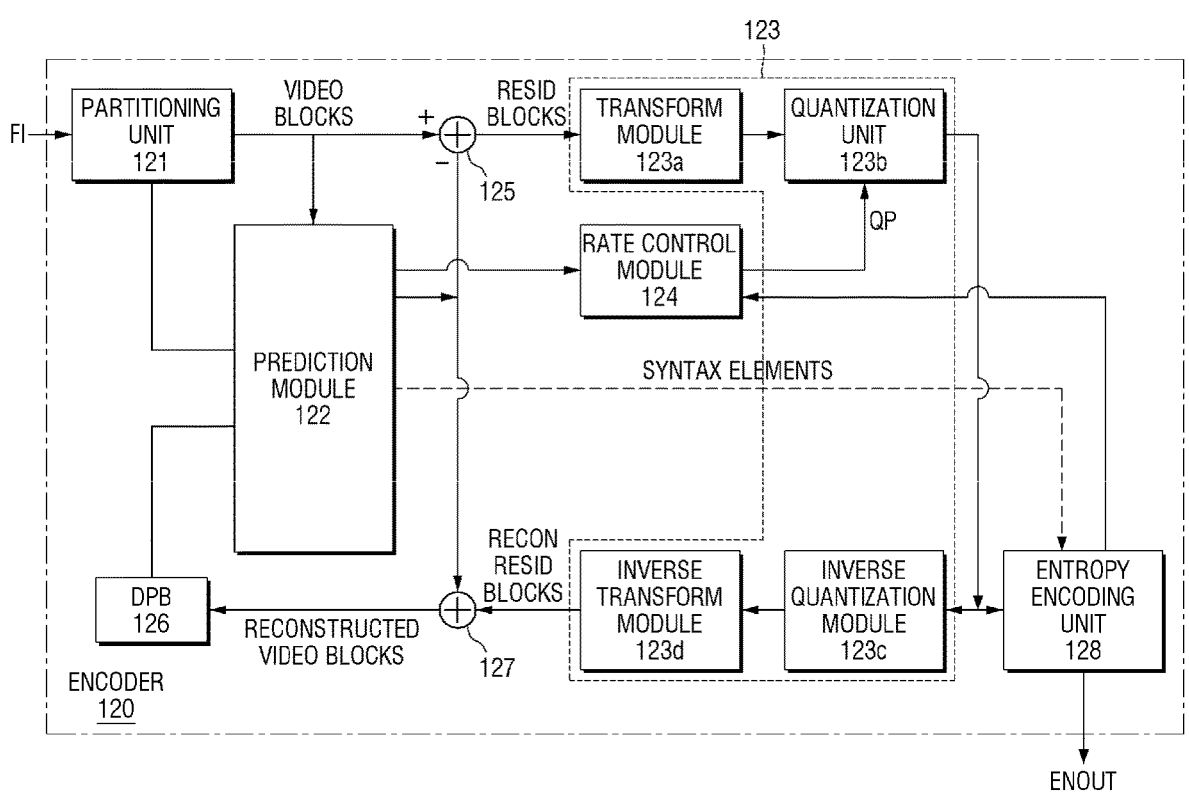
FIG. 2 is an example block diagram of an encoder included in the video encoding system illustrated in FIG. 1.

The modem 180 may output the data encoded by the encoder 120 or the processor 130 to outside the video encoding apparatus 100 using the wireless communication technique. For example, the modem 180 may adopt, but is not limited to, a method such as a WI-FI, a WIBRO, a 3G wireless communication, a long term evolution (LTETM), a long term evolution-advanced (LTE-A) or broadband LTE-A. FIG. 2 is an example block diagram of an encoder included in the video encoding system illustrated in FIG. 1.

In FIG. 2, the encoder 120 may include a partitioning unit 121, a prediction module 122, a compression module 123, a rate control module 124, a decoding picture buffer (DPB) 126, summers 125 and 127, and an entropy encoding unit 128. However, the encoder 120 may include more or fewer constituent elements than those listed above.

The partitioning unit 121 may classify the current frame (CF of FIG. 1) included in the second data FI into a plurality of blocks. In this case, the plurality of blocks may include at least one block corresponding to the region of interest, and may include at least one block corresponding to the non-region of interest. Whether each of the plurality of blocks is a block corresponding to a region of interest or a block corresponding to a non-region of interest may be classified based on information on the region of interest stored in the first memory (140 of FIG. 1).

The prediction module 122 may perform at least one of intra prediction and inter prediction of the input video. The intra prediction may be a prediction performed without referring to frames other than the current frame, and the inter prediction may be a prediction performed by referring to frames other than the current frame.

The rate control module 124 may adjust the quantization parameter (QP) value of each of the plurality of blocks included in the current frame. In this case, the rate control module 124 may differently set the quantization parameter value of the block corresponding to the region of interest and the quantization parameter value of the block corresponding to the non-region of interest. Here, the quantization parameter value set in the block corresponding to the non-region of interest may be larger than the quantization parameter value set in the block corresponding to the region of interest.

When setting the quantization parameter value of the block corresponding to the region of interest, the rate control module 124 may adjust the quantization parameter value, using a value of a first Current Buffer Fullness (CBF). Further, when setting the quantization parameter value of the block corresponding to the non-region of interest, the rate control module 124 may adjust the quantization parameter value, using a second CBF value. Here, the first CBF value may be a value associated with the block corresponding to the region of interest, and the second CBF value may be a value associated with the block corresponding to the non-region of interest. Therefore, the first CBF value and the second CBF value may be independent from each other.

The rate control module 124 may update the first CBF value or the second CBF value after performing the encoding of the current block. The first CBF value may be updated, based on the number of bits generated by the block corresponding to the region of interest and the number of target bits allocated to the block corresponding to the region of interest. The second CBF value may be updated based on the number of bits generated by the block corresponding to the non-region of interest and the number of target bits allocated to the block corresponding to the region of interest.

A compression module 123 may include a transform module 123a, a quantization unit 123b, an inverse quantization unit 123c, and an inverse transform module 123d.

The compression module 123 may form the compressed data, by performing the encoding operation of the input video based on the quantization parameter (QP) value of the non-region of interest and the quantization parameter (QP) value of the region of interest.

The transform module 123a may form the block data converted from the residual block data. The transform module 123a may use a discrete cosine transform (DCT), a wavelet transform, or the like. The transform coefficients generated by the transform module 123a may be sent to the quantization unit 123b.

The quantization unit 123b may quantize the transform coefficients to reduce the number of bits. In this process, the above-described rate control module 124 may correct the degree of quantization, by adjusting the quantization parameter (QP) values on the block corresponding to the region of interest and the block corresponding to the non-region of interest.

The inverse quantization unit 123c, the inverse transform module 123d, and the summer 127 may be used for inversely decoding lossy-coded data and restoring the reconstructed video. The reconstructed video is stored in the DPB 126 and may be used as a reference video.

The entropy encoding unit 128 may perform entropy coding of the compressed data. For example, the entropy encoding unit 128 may be a context-adaptive variable-length encoding (CAVLC), context-adaptive binary arithmetic encoding (CABAC), probability interval partition entropy (PIPE) or other entropy encoding techniques. Subsequent to the entropy encoding using the entropy encoding unit 128, an encoded bit stream may be formed, and the encoded bit stream may be sent to the decoder or stored in the second memory (20 of FIG. 1).

The entropy encoding unit 128 may also send information on the number of bits generated by the currently encoded block to the rate control module 124.

For example, the encoding system of the video encoding apparatus of FIG. 2 may be, for example, one of HEVC, VP8, VP9, MPEG-2, MPEG-4, H.263 and H.264. However, example embodiments are not limited thereto.

In relation to FIGS. 3 to 18, the repeated contents similar to FIGS. 1 and 2 will not be described again, and several example embodiments will be mainly described based on the differences.

Figure 3:
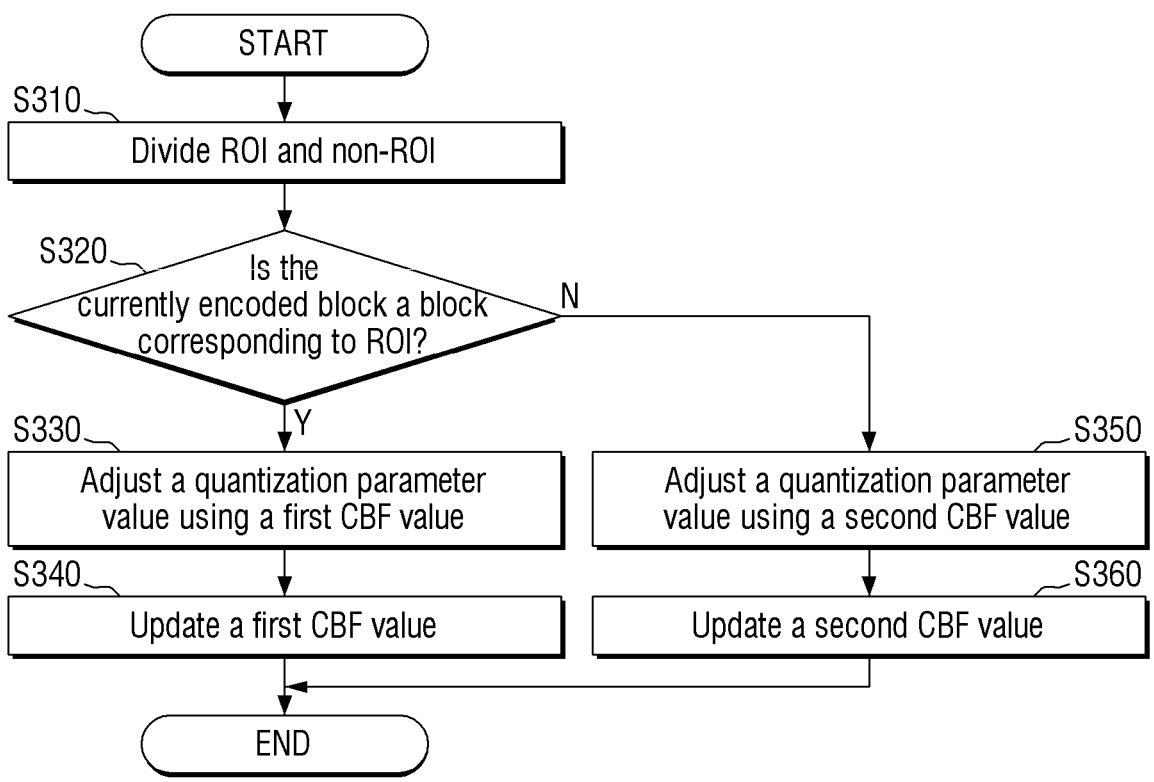
FIG. 3 is a flowchart illustrating a method for adjusting a quantization parameter value of a currently encoded block and updating a CBF value in the video encoding apparatus according to some example embodiments.
Figure 4:
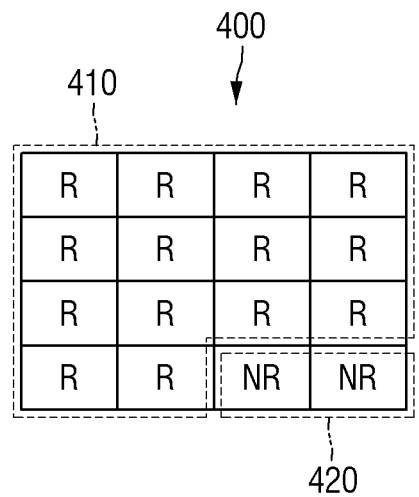
FIG. 4 is a diagram illustrating an example of a method for classifying a block corresponding to a region of interest and a block corresponding to a non-region of interest in the video encoding apparatus according to example embodiments.

FIG. 3 is a flowchart illustrating a method for adjusting a quantization parameter value of a block to be currently encoded and updating the CBF value in the video encoding apparatus according to some example embodiments. FIG. 4 is a diagram illustrating an example of a method for classifying the block corresponding to a region of interest and the block corresponding to a non-region of interest in the video encoding apparatus according to some example embodiments.

Referring to FIG. 3, in operation S310, the partitioning unit 121 may divide the current frame included in the input video into a plurality of blocks.

Here, the partitioning unit 121 may classify the plurality of blocks into blocks corresponding to the region of interest and blocks corresponding to the non-region of interest, based on information on the region of interest included in the first memory 140.

For example, referring to FIG. 4, the partitioning unit 121 may classify the blocks R corresponding to the region of interest and the blocks NR corresponding to the non-region of interest, based on information on the region of interest.

Information on the region of interest may include a region of interest map 400. The region of interest map 400 may include information on which one of the plurality of blocks included in the current frame is a block R corresponding to the region of interest. Further, the region of interest map 400 may include information on which one of the plurality of blocks included in the current frame is a block NR corresponding to the non-region of interest.

For example, the partitioning unit 121 may recognize blocks included in the first region 410 as blocks corresponding to the region of interest and may recognize the blocks included in the second region 420 as blocks corresponding to the non-region of interest, based on the region of interest map 400.

According to some example embodiments, the rate control module 124 may also calculate the number of target bits of each of the plurality of blocks, using the number of target bits of the current frame and the number of the plurality of blocks. Specifically, the rate control module 124, for example, may calculate the number of target bits of each of a plurality of blocks, using the number of target bits of the current frame, the number of plurality of blocks, the number of blocks corresponding to the region of interest included in the plurality of blocks, the number of blocks corresponding to the non-region of interest included in the plurality of blocks or the like. In this case, the number of target bits allocated to the block corresponding to the region of interest may be larger than the number of target bits allocated to the block corresponding to the non-region of interest.

As an example, the rate control module 124 may determine the number of target bits allocated to each block, by dividing the number of target bits of the current frame by the number of blocks included in the current frame. However, the rate control module 124 may give weight to the blocks corresponding to the region of interest so that the number of target bits larger than the blocks corresponding to the non-region of interest is allocated to the blocks corresponding to the region of interest.

The method for calculating the number of target bits of each of the plurality of blocks is not limited to the above example, and may be calculated through various methods. However, even if the number of target bits is calculated using another method, the number of bits larger than the block corresponding to the non-region of interest may be allocated to the block corresponding to the region of interest.

Referring again to FIG. 3, in operation S320, the rate control module 124 may recognize whether the currently encoded block is a block corresponding to the region of interest.

As an example, the rate control module 124 may receive information on whether the currently encoded block is a block corresponding to the region of interest or a block corresponding to the non-region of interest, from the partitioning unit 121.

If the currently encoded block is recognized as a block corresponding to the region of interest (Y in S320), in operation S330, the rate control module 124 may adjust the quantization parameter value of the currently encoded block, based on the value of the first CBF (current buffer fullness). This will be described in more detail with reference to FIGS. 6 and 9.

The first CBF value may be a value in which it is possible to check how many bits can be allocated to the blocks corresponding to the region of interest in the future based on the target bits allocated to the blocks corresponding to the region of interest.

The quantization unit 123b may quantize the currently encoded block (the block corresponding to the region of interest), using the quantization parameter value generated through operation S330. On the other hand, the entropy encoding unit 128 may send information on the number of bits generated by the currently encoded block to the rate control module 124.

After performing the encoding of the current block corresponding to the region of interest, using the quantization parameter value adjusted through operation S330, in operation S340, the rate control module 124 may update the first CBF value based on the number of target bits allocated to the encoded block and the number of bits generated by the encoded block.

For example, after performing the encoding of the block corresponding to the region of interest, the rate control module 124 may update the first CBF value, using the value obtained by subtracting the number of target bits allocated to the encoded block from the number of bits generated by the encoded block. This will be described in more detail later with reference to FIGS. 7, 8, 10, and 11.

On the other hand, when the rate control module 124 recognizes that the currently encoded block is not a block corresponding to the region of interest (N in S320), in operation S350, the rate control module 124 may recognize the currently encoded block as a non-region of interest, and may adjust the quantization parameter value of the currently encoded block based on the second CBF value different from the first CBF value. This will be described in more detail with reference to FIGS. 12 and 15.

The second CBF value may be a value in which it is possible to check how many bits can be allocated to the block corresponding to the non-region of interest in future, based on the target bits allocated to the blocks corresponding to the non-region of interest.

The quantization unit 123b may quantize the currently encoded block (the block corresponding to the non-region of interest), using the quantization parameter value generated through operation S350. On the other hand, the entropy encoding unit 128 may transmit information on the number of bits generated by the currently encoded block to the rate control module 124.

After performing the encoding of the current block corresponding to the non-region of interest, using the quantization parameter value adjusted through operation S330, in operation S360, the rate control module 124 may update the second CBF value based on the number of target bits allocated to the encoded block and the number of bits generated by the encoded block.

For example, after performing the encoding of the block corresponding to the non-region of interest, the rate control module 124 may update the second CBF value, using the value obtained by subtracting the number of target bits allocated to the encoded block from the number of bits generated by the encoded block. This will be described in more detail with reference to FIGS. 13, 14, 16, and 17.

Figure 5:
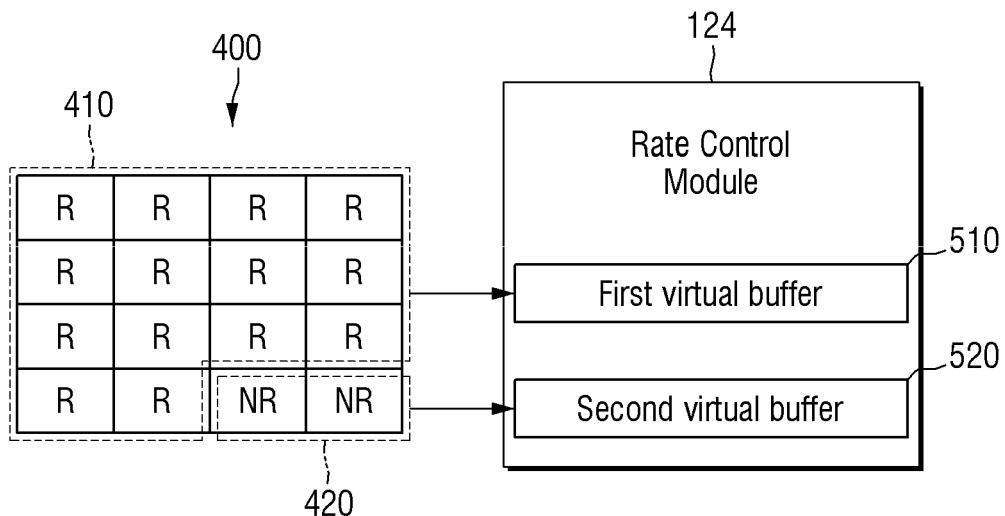
FIG. 5 is a diagram illustrating a virtual buffer which stores CBF values used when adjusting the quantization parameter values in the video encoding apparatus according to some example embodiments.

FIG. 5 is a diagram illustrating a virtual buffer which stores CBF values used when adjusting the quantization parameter value in the video encoding apparatus according to some embodiments.

Referring to FIG. 5, the rate control module 124 may include a first virtual buffer 510 and a second virtual buffer 520. The first virtual buffer 510 may be a region in which the first CBF value is stored, and the second virtual buffer 520 may be a region in which the second CBF value is stored.

The first virtual buffer 510 and the second virtual buffer 520 may be provided in the manner of hardware or may be provided in the manner of software.

When encoding the blocks R corresponding to the region of interest included in the first region 410, the rate control module 124 may adjust the quantization parameter values of the blocks R corresponding to the region of interest, using the first CBF value stored in the first virtual buffer 510.

When encoding the blocks NR corresponding to the non-region of interest included in the second region 420, the rate control module 124 may adjust the quantization parameter values of the blocks NR corresponding to the non-region of interest, using the second CBF value stored in the second virtual buffer 520.

According to some example embodiments, the first CBF value stored in the first virtual buffer 510 may be independent of the second CBF value stored in the second virtual buffer 520. Therefore, when adjusting the quantization parameter value of the block corresponding to the region of interest, the rate control module 124 may use only the first CBF value, and when adjusting the quantization parameter value of the block corresponding to the non-region of interest, the rate control module 124 may use only the second CBF value.

FIGS. 6 to 17 are diagrams for explaining an example of a method for adjusting quantization parameter values of each of a plurality of blocks and a method for updating CBF values in the video encoding apparatus according to some example embodiments.

Figure 6:
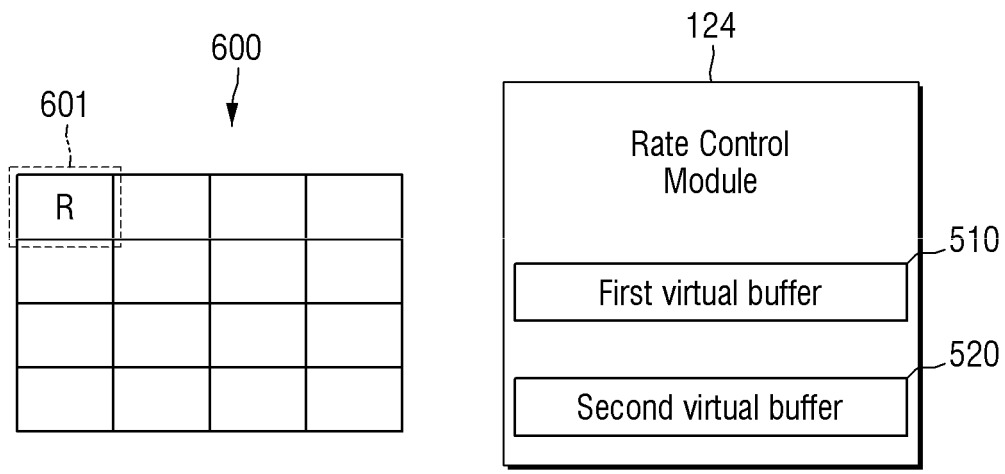
FIGS. 6 to 17 are diagrams for explaining examples of a method for adjusting quantization parameter values of each of a plurality of blocks and a method for updating CBF values in the video encoding apparatus according to some example embodiments.

Referring to FIG. 6, when encoding a first block 601 among a plurality of blocks included in a current frame 600, the rate control module 124 may initialize a first virtual buffer 510 and a second virtual buffer 520. Here, the first block 601 may be a block that is first encoded, among the plurality of blocks included in the current frame 600.

When the first virtual buffer 510 and the second virtual buffer 520 are initialized, the first CBF value stored in the first virtual buffer 510 and the second CBF value stored in the second virtual buffer 520 may be initialized.

On the other hand, when performing the encoding of the first block 601, the rate control module 124 may determine the quantization parameter value of the first block 601, using the complexity of the image included in the first block 601, the quantization parameter value allocated to the block included in the previous frame, the number of target bits allocated to the first block 601, and the like. In this case, when the first block 601 is recognized as the block R corresponding to the region of interest, the rate control module 124 may adjust the quantization parameter value determined in the first block 601, using the first CBF value.

However, as described above, since the first CBF value has been initialized, the rate control module 124 may apply the determined quantization parameter value to the first block 601.

Figure 7:
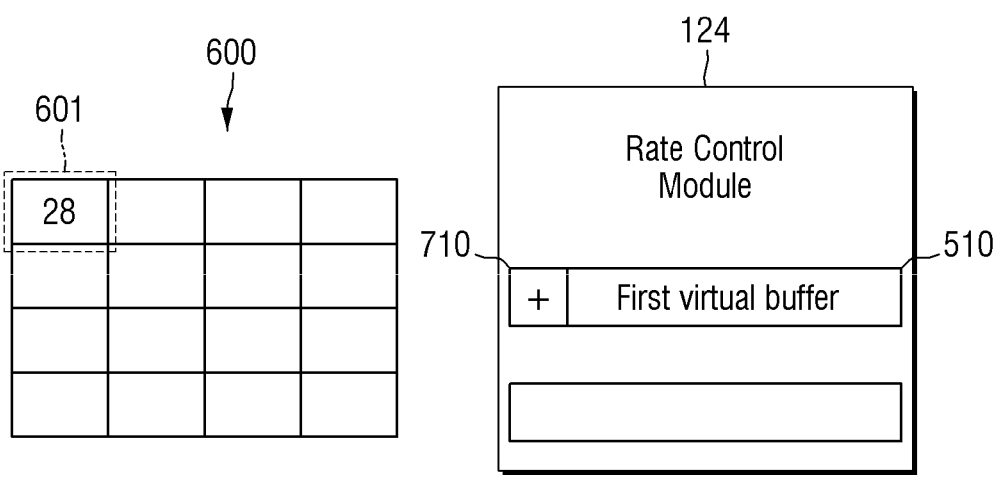
Figure 8:
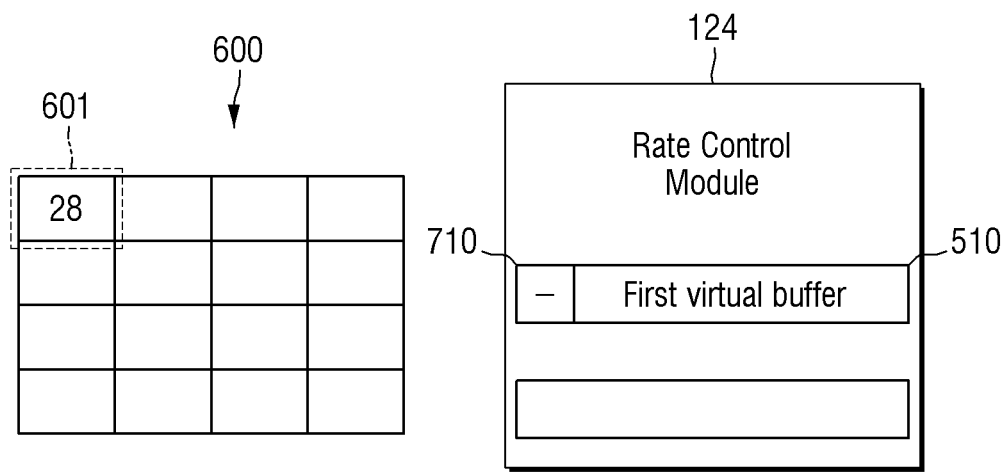

For example, referring to FIGS. 7 and 8, the rate control module 124 may determine the quantization parameter value as 28 for the first block 601 included in the current frame 600.

On the other hand, after performing the encoding of the first block 601 corresponding to the region of interest, the rate control module 124 may update the first CBF value stored in the first virtual buffer 510, using the value obtained by subtracting the number of target bits allocated to the first block 601 from the number of bits generated by the first block 601.

As illustrated in FIG. 7, when the number of bits generated by the first block 601 is larger than the number of target bits allocated to the first block 601, the subtracted value may have a positive value. Therefore, the positive value may be stored as the first CBF value 710 in the first virtual buffer 510.

On the other hand, as illustrated in FIG. 8, when the number of bits generated by the first block 601 included in the current frame 600 is smaller than the number of target bits allocated to the first block 601, the above subtracted value may have a negative value. Therefore, the negative value may be stored as the first CBF value 710 in the first virtual buffer 510.

Figure 9:
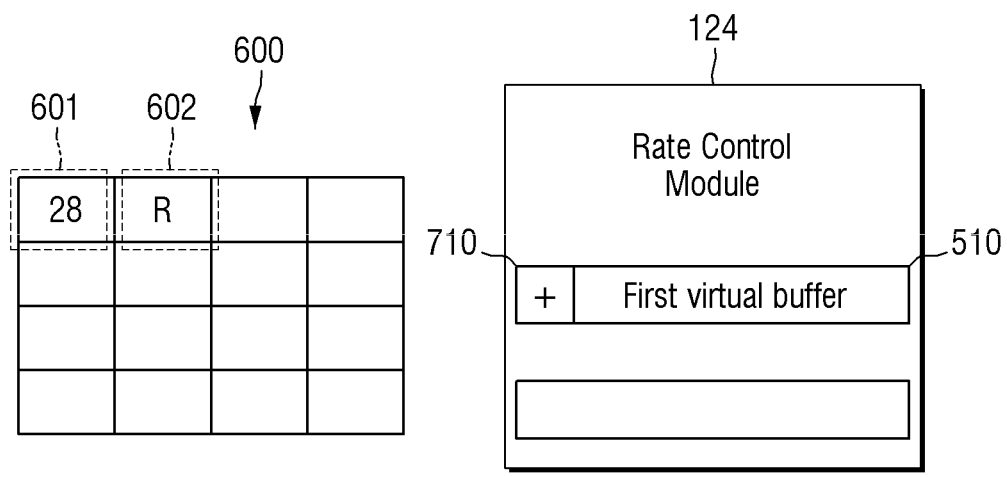

Referring to FIG. 9, when performing the encoding of the second block 602 included in the current frame 600, the rate control module 124 may determine the quantization parameter value of the second block 602, using complexity of the image included inside the second block 602, the quantization parameter value allocated to the first block 601 encoded before the second block 602 is encoded, the number of target bits allocated to the second block 602 and the like. In this case, when the second block 602 is recognized as a block R corresponding to the region of interest, the rate control module 124 may adjust the quantization parameter value determined for the second block 602, using the first CBF value 710 stored in the first virtual buffer 510.

As an example, since the first CBF value 710 stored in the first virtual buffer 510 has a positive value, the rate control module 124 may adjust the quantization parameter value determined for the second block 602 to increase.

As another example, when the first CBF value 710 stored in the first virtual buffer 510 exceeds a desired (or, alternatively a predetermined) positive value, the rate control module 124 may adjust the quantization parameter value determined for the second block 602 to increase.

Figure 10:
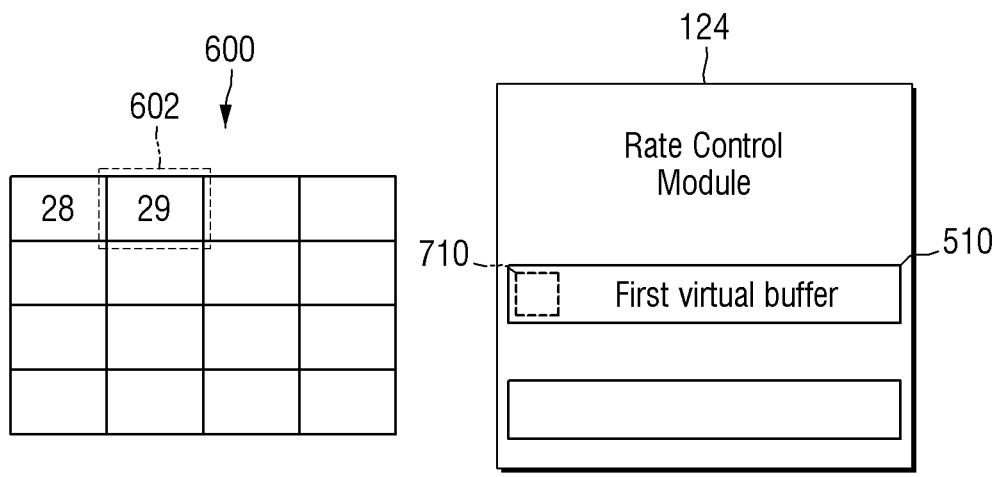

Referring to FIG. 10, the rate control module 124 may determine the quantization parameter value as 28 for the second block 602 included in the current frame 600. Further, the rate control module 124 may adjust the determined quantization parameter value based on the first CBF value to adjust the quantization parameter value of the second block 602 to become 29.

On the other hand, after performing the encoding of the second block 602 corresponding to the region of interest, the rate control module 124 may update the first CBF value 710 stored in the first virtual buffer 510, using the value obtained by subtracting the number of target bits allocated to the second block 602 from the number of bits generated by the second block 602.

When the quantization parameter value is adjusted by the first CBF value, the number of bits generated by the second block 602 may be smaller than the number of target bits allocated to the second block 602. In this case, the rate control module 124 may reduce the first CBF value 710 stored in the first virtual buffer 510 as illustrated in FIG. 10, by updating the first CBF value 710, using the value obtained by subtracting the number of target bits allocated to the second block 602 from the number of bits generated by the second block 602.

Figure 11:
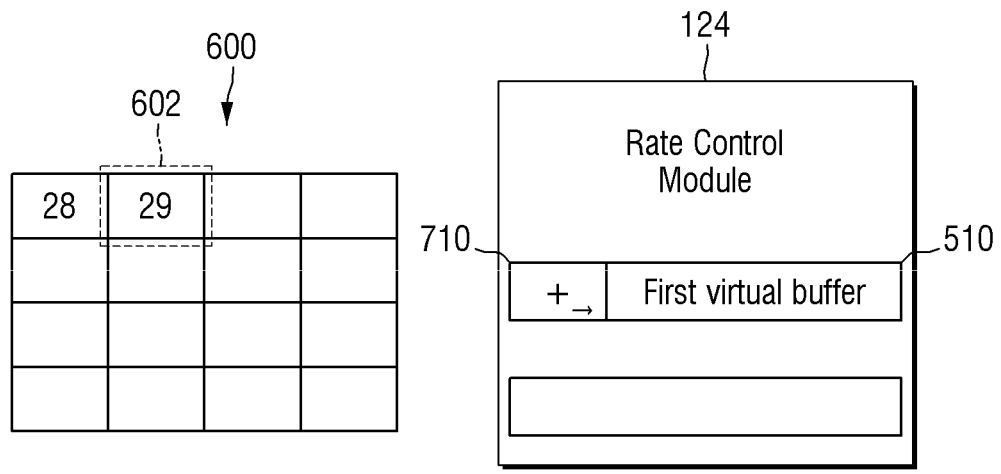

However, since the complexity of the image included in the second block 602 of the current frame 600 is high, the number of bits generated by the second block 602 may be larger than the number of target bits allocated to the second block 602. In this case, the rate control module 124 may increase the first CBF value 710 stored in the first virtual buffer 510 as illustrated in FIG. 11, by updating the first CBF value 710, using the value obtained by subtracting the number of target bits allocated to the second block 602 from the number of bits generated by the second block 602.

Figure 12:
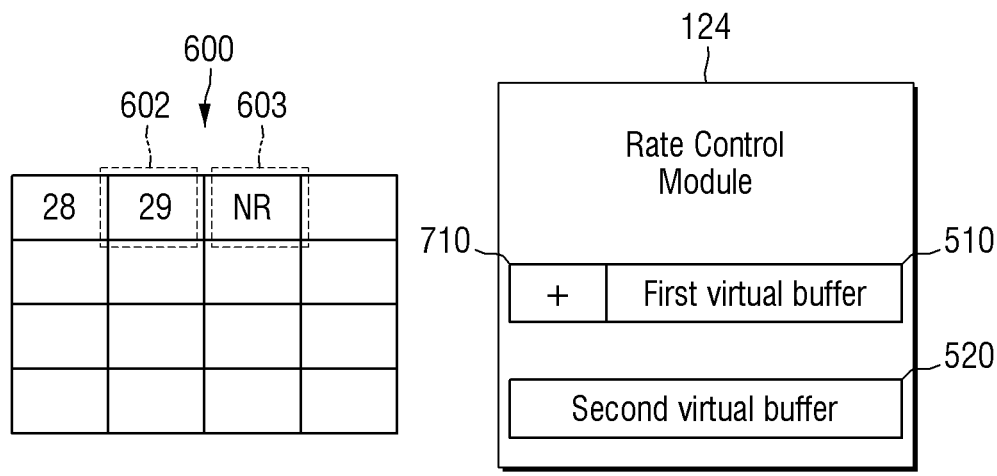

Referring to FIG. 12, when performing the encoding of the third block 603, the rate control module 124 may determine the quantization parameter value of the third block 603, using the complexity of the image included in the third block 603, the quantization parameter value allocated to the second block 602 encoded before the third block 603 is encoded, the number of target bits allocated to the third block 603, and the like. In this case, when the third block 603 is recognized as a block NR corresponding to the non-region of interest, the rate control module 124 may adjust the quantization parameter value determined for the third block 603, using the second CBF value stored in the second virtual buffer 520.

That is, although the second block 602 and the third block 603 are blocks that are adjacent to each other, the rate control module 124 may adjust the quantization parameter values of the second block 602 and the third block 603, using the CBF values different from each other.

On the other hand, as described above with reference to FIG. 6, after the second CBF value is initialized, since the block corresponding to the non-region of interest is not encoded, the rate control module 124 may apply the determined quantization parameter value to the third block 603.

Also, since the third block 603 is a block NR corresponding to the non-region of interest, the first CBF value 710 stored in the first virtual buffer 510 may not be used to adjust the quantization parameter value determined for the third block 603.

Figure 13:
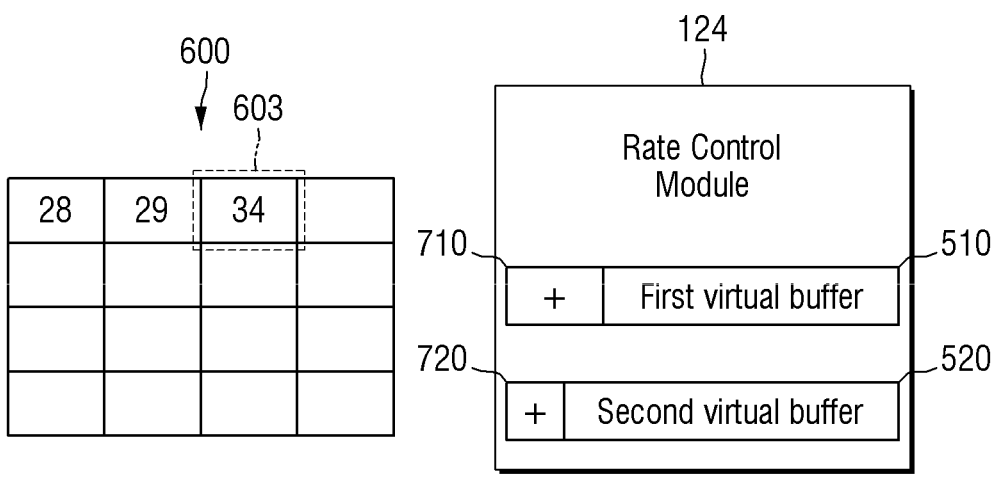
Figure 14:
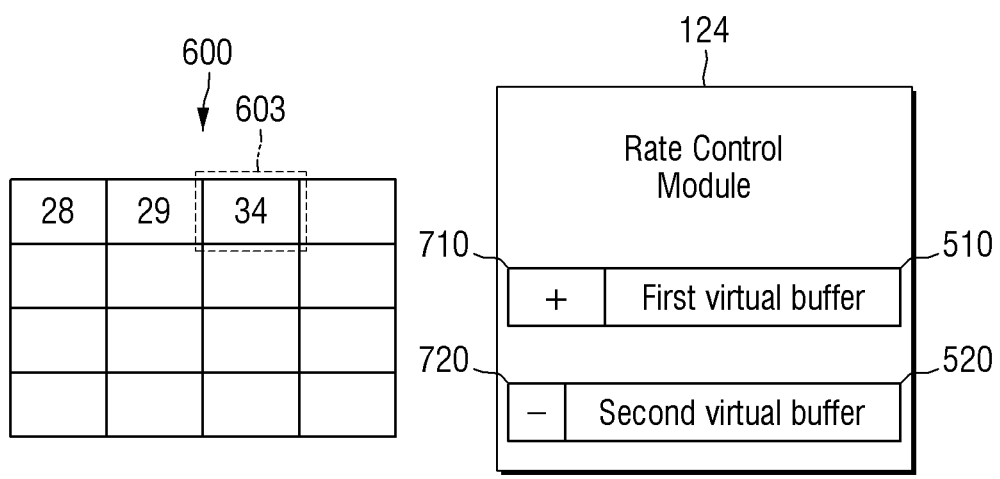

Referring to FIGS. 13 and 14, the rate control module 124 may determine the quantization parameter value as 34 for the third block 603 included in the current frame 600.

On the other hand, after performing the encoding of the third block 603 corresponding to the non-region of interest, the rate control module 124 may update the second CBF value 720 stored in the second virtual buffer 520, using the value obtained by subtracting the number of target bits allocated to the third block 603 from the number of bits generated by the third block 603. In this case, the first CBF value 710 stored in the first virtual buffer 510 is not updated.

As illustrated in FIG. 13, when the number of bits generated by the third block 603 is greater than the number of target bits allocated to the third block 603, the subtracted value may have a positive value. Therefore, the positive value may be stored as the second CBF value 720 in the second virtual buffer 520.

On the other hand, as illustrated in FIG. 14, when the number of bits generated by the third block 603 is smaller than the number of target bits allocated to the third block 603, the subtracted value may have a negative value. Therefore, the negative value may be stored as the second CBF value 720 in the second virtual buffer 520.

Figure 15:
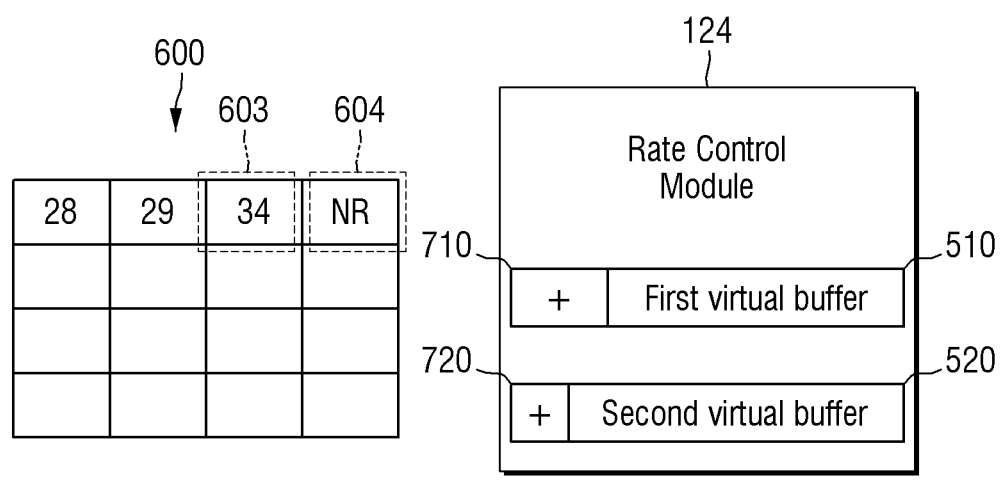

Referring to FIG. 15, when performing the encoding of the fourth block 604, the rate control module 124 may determine the quantization parameter value of the fourth block 604, using the complexity of the image included in the fourth block 604, the quantization parameter value allocated to the third block 603 encoded before the fourth block 604 is encoded, the number of target bits allocated to the fourth block 604, and the like. In this case, when the fourth block 604 is recognized as a block NR corresponding to the non-region of interest, the rate control module 124 may adjust the quantization parameter value determined for the fourth block 604, using the second CBF value 720 stored in the second virtual buffer 520.

As an example, since the second CBF value 720 stored in the second virtual buffer 520 has a positive value, the rate control module 124 may adjust the quantization parameter value determined for the fourth block 604 to increase.

As another example, when the second CBF value 720 stored in the first virtual buffer 510 exceeds a desired (or, alternatively a predetermined) positive value, the rate control module 124 may adjust the quantization parameter value determined for the fourth block 604 to increase.

Since the fourth block 604 is a block NR corresponding to the non-region of interest, the first CBF value 710 stored in the first virtual buffer 510 may not be used to adjust the quantization parameter value determined for the fourth block 604.

Figure 16:
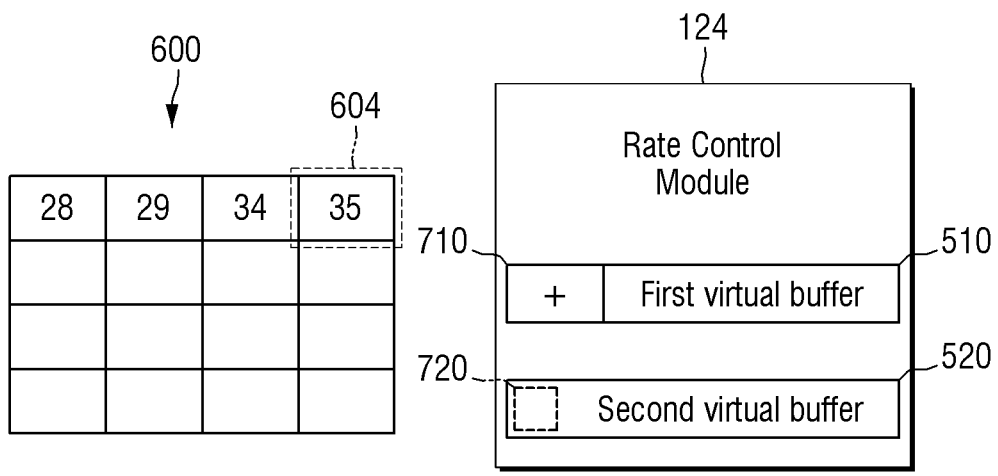

Referring to FIG. 16, the rate control module 124 may determine the quantization parameter value as 34 for the fourth block 604 included in the current frame 600. Further, the rate control module 124 may adjust the determined quantization parameter value based on the second CBF value 720, thereby adjusting the quantization parameter value of the fourth block 604 to become 35.

On the other hand, after performing the encoding of the fourth block 604 corresponding to the non-region of interest, the rate control module 124 may update the second CBF value 720 stored in the second virtual buffer 520, using the value obtained by subtracting the number of target bits allocated to the fourth block 604 from the number of bits generated by the fourth block 604.

When the quantization parameter value is adjusted by the second CBF value 720, the number of bits generated by the fourth block 604 may be smaller than the number of target bits allocated to the fourth block 604. In this case, the rate control module 124 may reduce the second CBF value 720 stored in the second virtual buffer 520 as illustrated in FIG. 17, by updating the second CBF value 720, using the value obtained by subtracting the number of target bits allocated to the fourth block 604 from the number of bits generated by the fourth block 604.

Figure 17:
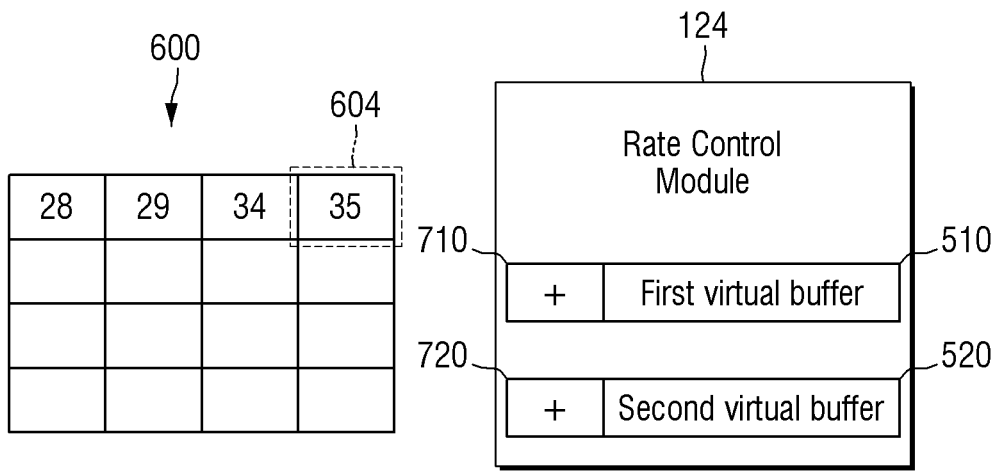

However, even if the complexity of the image included in the fourth block 604 of the current frame 600 is high, the number of bits generated by the fourth block 604 may be larger than the number of target bits allocated to the fourth block 604, as illustrated in FIG. 17. In this case, the rate control module 124 may increase the second CBF value 720 stored in the second virtual buffer 520 as illustrated in FIG. 17, by updating the second CBF value 720, using the value obtained by subtracting the number of target bits allocated to the fourth block 604 from the number of bits generated by the fourth block 604.

Figure 18:
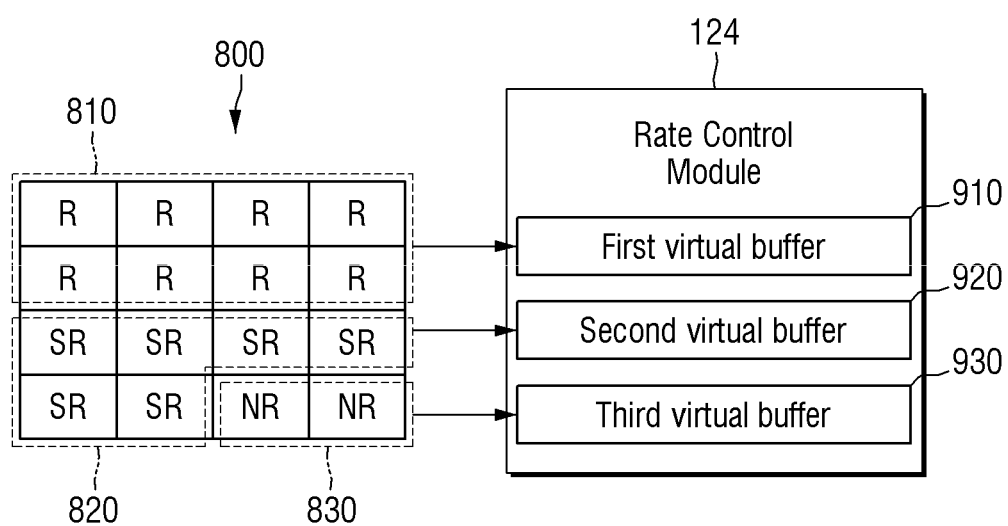
FIG. 18 is a diagram illustrating a virtual buffer which stores CBF values used when adjusting the quantization parameter values in the video encoding apparatus according to some example embodiments.

FIG. 18 is a diagram illustrating a virtual buffer which stores the CBF values used when adjusting the quantization parameter values in the video encoding apparatus according to some example embodiments.

Referring to FIG. 18, the rate control module 124 may include a first virtual buffer 910, a second virtual buffer 920, and a third virtual buffer 930. The first virtual buffer 910 may be a region in which the first CBF value is stored, the second virtual buffer 920 may be a region in which the second CBF value is stored, and the third virtual buffer 930 may be a region in which the third CBF value is stored. The first CBF value, the second CBF value, and the third CBF value may be independent of each other.

Although FIG. 18 illustrates only a case where there are two regions of interest, example embodiments are not limited thereto, and the number of regions of interest may be three or more, and the rate control module 124 may include the same number of virtual buffers as that of the regions of interest.

Meanwhile, the first virtual buffer 910, the second virtual buffer 920, and the third virtual buffer 930 may be provided in the manner of hardware or may be provided in the manner of software.

The rate control module 124 may classify the plurality of blocks included in the current frame into a block corresponding to the region of interest, a block corresponding to the sub-region of interest, and a block corresponding to the non-region of interest, based on information on the region of interest. Here, the sub-region of interest may be a region in which importance is lower than that of the region of interest and is higher than the non-region of interest.

Information on the region of interest may include a region of interest map 800. The region of interest map 800 may include information on which one of the plurality of blocks included in the current frame is a block R corresponding to the region of interest. Further, the region of interest map 800 may include information on which one of the plurality of blocks included in the current frame is a block SR corresponding to the sub-region of interest. Further, the region of interest map 800 may include information on which one of the plurality of blocks included in the current frame is a block NR corresponding to the non-region of interest.

When encoding the blocks R corresponding to the region of interest included in the first region 810, the rate control module 124 may adjust the quantization parameter values of the blocks R corresponding to the region of interest, using the first CBF value stored in the first virtual buffer 910.

When encoding the blocks SR corresponding to the sub-region of interest included in the second region 420, the rate control module 124 may adjust the quantization parameter value of the blocks SR corresponding to the sub-region of interest, using the second CBF value stored in the second virtual buffer 920.

When encoding the blocks NR corresponding to the non-region of interest included in the third region 430, the rate control module 124 may adjust the quantization parameter values of the blocks NR corresponding to the non-region of interest, using the third CBF value stored in the third virtual buffer 930.

The rate control module 124 may update the first CBF value when the currently encoded block is a block corresponding to the region of interest. The rate control module 124 may update the second CBF value when the currently encoded block is a block corresponding to a sub-region of interest. The rate control module 124 may update the third CBF value when the currently encoded block is a block corresponding to the non-region of interest.

According to the aforementioned example embodiments, there is an effect of enhancing the accuracy of the rate control, by adjusting the quantization parameter values of the blocks corresponding to each region based on the CBF values stored in each of the multiple virtual buffers.

While example embodiments have been particularly illustrated and described with reference to some example embodiments thereof, it will be understood by those of ordinary skill in the art that various changes in form and detail may be made therein without departing from the spirit and scope of the example embodiments as defined by the following claims. The example embodiments described should be considered in a descriptive sense only and not for purposes of limitation.

The example embodiments have been described with reference to the attached drawings, but it may be understood by one of ordinary skill in the art that the present disclosure may be performed one of ordinary skill in the art in other specific forms without changing the technical concept or essential features of the present disclosure. Further, the above-described example embodiments are merely examples and do not limit the scope of the rights of the present disclosure.

As discussed above, the various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The operations of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

What is claimed is:

1. A video encoding apparatus comprising:
a memory and a processor, the memory containing computer readable code executable by the processor to,
divide a frame included in input video into a plurality of blocks,
classify the plurality of blocks into at least one block corresponding to a region of interest (ROI), at least one block corresponding to a sub-region of interest (sub-ROI), and at least one block corresponding to a non-region of interest (non-ROI),
adjust a first quantization parameter value of the at least one block corresponding to the ROI based on a first current buffer fullness (CBF) value of the ROI, wherein the first CBF value is stored in a first region of the memory,
adjust a second quantization parameter value of the at least one block corresponding to the sub-ROI based on a second current buffer fullness (CBF) value of the sub-ROI, wherein the second CBF value is stored in a second region of the memory,
adjust a third quantization parameter value of the at least one block corresponding to the non-ROI based on a third current buffer fullness (CBF) value of the non-ROI, wherein the third CBF is stored in a third region of the memory,
increase or decrease the first CBF value stored in the first region of the memory by updating the first CBF value,
increase or decrease the second CBF value stored in the second region of the memory by updating the second CBF value, and
increase or decrease the third CBF value stored in the third region of the memory by updating the third CBF value,
wherein the first CBF value is stored in the first region of the memory, the second CBF value is stored in the second region of the memory, and the third CBF value is stored in the third region of the memory so that the first CBF value, the second CBF value and, the third CBF value are independent from each other, and
wherein level of importance of the sub-ROI is lower than level of importance of the ROI and the level of importance of the sub-ROI is higher than level of importance of the non-ROI.

2. The video encoding apparatus of claim 1, wherein the processor is configured to,
encode a first block corresponding to the ROI, and
update the first CBF value based on a number of bits generated by the first block and a number of target bits allocated to the first block.

3. The video encoding apparatus of claim 2, wherein the processor is configured to update the first CBF value by a value obtained by subtracting the number of target bits allocated to the first block from the number of bits generated by the first block.

4. The video encoding apparatus of claim 1, wherein the processor is configured to,
encode a second block corresponding to the sub-ROI, and
update the second CBF value based on a number of bits generated by the second block and a number of target bits allocated to the second block.

5. The video encoding apparatus of claim 4, wherein the processor is configured to update the second CBF value by a value obtained by subtracting the number of target bits allocated to the second block from the number of bits generated by the second block.

6. The video encoding apparatus of claim 1, wherein the processor is configured to,
encode a third block corresponding to the non-ROI, and
update the third CBF value based on a number of bits generated by the third block and a number of target bits allocated to the third block.

7. The video encoding apparatus of claim 6, wherein the processor is configured to update the third CBF value by a value obtained by subtracting the number of target bits allocated to the third block from the number of bits generated by the third block 1, wherein the processor is configured to adjust a third quantization parameter value of a block.

8. The video encoding apparatus of claim 1, wherein each the first region of the memory, the second region of the memory, and the third region of the memory is provided in a manner of hardware or in a manner of software.

9. A video encoding apparatus comprising:
a memory and a processor, the memory containing computer readable code executable by the processor to,
divide a frame included in input video into a plurality of blocks, the plurality of blocks each corresponding to one of a region of interest (ROI), a sub-region of interest (sub-ROI), and a non-region of interest (non-ROI),
classify the plurality of blocks into at least one block corresponding to the ROI, at least one block corresponding to the sub-ROI, and at least one block corresponding to the non-ROI,
update, after encoding a first block of the plurality of blocks, a first current buffer fullness (CBF) value of the ROI based on a number of bits generated by the first block and a number of target bits of the first block, when the encoded first block is a block corresponding to the ROI,
update, after encoding the first block, a second CBF value of the sub-ROI based on a number of bits generated by the first block and a number of target bits of the first block, when the encoded first block is a block corresponding to the sub-ROI, and
update, after encoding the first block, a third CBF value of the non-ROI based on a number of bits generated by the first block and a number of target bits of the first block, when the encoded first block is a block corresponding to the non-ROI,
wherein the first CBF value is stored in a first region of the memory, the second CBF value is stored in a second region of the memory, and the third CBF value is stored in a third region of the memory so that the first CBF value, the second CBF value and, the third CBF value are independent from each other, and
wherein level of importance of the sub-ROI is lower than level of importance of the ROI and the level of importance of the sub-ROI is higher than level of importance of the non-ROI.

10. The video encoding apparatus of claim 9, wherein, when encoding a third block of the plurality of blocks corresponding to the sub-ROI after performing encoding of the first block, the processor is configured to adjust a second quantization parameter value of the third block based on the second CBF value.

11. The video encoding apparatus of claim 9, wherein, when encoding a second block of the plurality of blocks corresponding to the ROI after encoding of the first block, the processor is configured to adjust a first quantization parameter value of the second block based on the first CBF value.

12. The video encoding apparatus of claim 9, wherein, when encoding a fourth block of the plurality of blocks corresponding to the non-ROI after performing encoding of the first block, the processor is configured to adjust a third quantization parameter value of the fourth block based on the third CBF value.

13. A video encoding method comprising:
dividing a frame included in input video into a plurality of blocks;
classifying the plurality of blocks into at least one block corresponding to a region of interest (ROI), at least one block corresponding to a sub-region of interest (sub-ROI), and at least one block corresponding to a non-region of interest (non-ROI);
adjusting a first quantization parameter value of the at least one block corresponding to the ROI based on a first current buffer fullness (CBF) value of the ROI, wherein the first CBF value is stored in a first region of a memory;
adjusting a second quantization parameter value of the at least one block corresponding to the sub-ROI based on a second current buffer fullness (CBF) value of the sub-ROI, wherein the second CBF value is stored in a second region of the memory;
adjusting a third quantization parameter value of the at least one block corresponding to the non-ROI based on a third current buffer fullness (CBF) value of the non-ROI, wherein the third CBF is stored in a third region of the memory;
increasing or decreasing the first CBF value stored in the first region of the memory by updating the first CBF value;
increasing or decreasing the second CBF value stored in the second region of the memory by updating the second CBF value; and
increasing or decreasing the third CBF value stored in the third region of the memory by updating the third CBF value,
wherein the first CBF value is stored in the first region of the memory, the second CBF value is stored in the second region of the memory, and the third CBF value is stored in the third region of the memory so that the first CBF value, the second CBF value and, the third CBF value are independent from each other, and
wherein level of importance of the sub-ROI is lower than level of importance of the ROI and the level of importance of the sub-ROI is higher than level of importance of the non-ROI.

14. The video encoding method of claim 13, further comprising:
encoding a first block corresponding to the ROI; and
updating the first CBF value based on a number of bits generated by the first block and a number of target bits allocated to the first block.

15. The video encoding method of claim 14 further comprising updating the first CBF value by a value obtained by subtracting the number of target bits allocated to the first block from the number of bits generated by the first block.

16. The video encoding method of claim 13, further comprising
encoding a second block corresponding to the sub-ROI; and
updating the second CBF value based on a number of bits generated by the second block and a number of target bits allocated to the second block.

17. The video encoding method of claim 16, further comprising:
updating the second CBF value by a value obtained by subtracting the number of target bits allocated to the second block from the number of bits generated by the second block.

18. The video encoding method of claim 13, further comprising:

encoding a third block corresponding to the non-ROI, and
updating the third CBF value based on a number of bits generated by the third block and a number of target bits allocated to the third block.

19. The video encoding method of claim 18, further comprising:
updating the third CBF value by a value obtained by subtracting the number of target bits allocated to the third block from the number of bits generated by the third block.

20. The video encoding method of claim 13, wherein each the first region of the memory, the second region of the memory, and the third region of the memory is provided in a manner of hardware or in a manner of software.

* * * * *